United States Patent [19]
Eitel

[11] Patent Number: 4,553,457
[45] Date of Patent: Nov. 19, 1985

[54] MACHINING A COOLED CYLINDRICAL OPTIC TO COMPENSATE FOR PRESSURE DISTORTION

[75] Inventor: Frederick G. Eitel, North Palm Beach, Fla.

[73] Assignee: The United States of America as represented by the Secretary of the Air Force, Washington, D.C.

[21] Appl. No.: 505,166

[22] Filed: Jun. 17, 1983

[51] Int. Cl.[4] .......................... B23B 1/00; B23B 5/00
[52] U.S. Cl. ..................................... 82/1 C; 82/2 B; 51/284 R
[58] Field of Search .................... 82/1 R, 1 C, 2 B; 350/310, 320, 295; 51/284 R, 216 LP

[56] References Cited
U.S. PATENT DOCUMENTS

| 1,494,134 | 5/1924 | Ritterrath . | |
| 1,530,441 | 3/1925 | Thomson | 350/310 |
| 2,851,916 | 9/1958 | Grandy et al. | 82/1 C |
| 3,210,894 | 10/1965 | Bentley et al. | 51/284 R |
| 3,521,943 | 7/1970 | Kelderman | 350/295 |
| 3,596,125 | 7/1971 | Seigel | 313/22 |
| 3,686,940 | 8/1972 | Kockott | 73/150 |
| 3,720,120 | 3/1973 | Cutler | 82/2 B |
| 3,914,010 | 10/1975 | Zeller | 350/3 |
| 4,190,327 | 2/1980 | Hughes | 350/310 |

FOREIGN PATENT DOCUMENTS

| 161180 | 12/1970 | Japan | 82/1 C |
| 80240 | 7/1978 | Japan | 51/284 R |
| 598698 | 3/1978 | U.S.S.R. | 82/1 C |

OTHER PUBLICATIONS

"Diamond Turning of F-111 Windscreens", Optical Engineering, vol. 17, No. 6, Nov.-Dec. 1978.

Primary Examiner—Leonidas Vlachos
Assistant Examiner—Jerry Kearns
Attorney, Agent, or Firm—Donald J. Singer; Jacob N. Erlich

[57] ABSTRACT

A system for, and a method of, replicating the known (i.e., ascertained) operational coolant fluid flow local pressure in an optical surface (such as a mirror surface) of the heat exchanger portion of a fluid cooled cylindrical optic. The system essentially comprises a precision numerically controlled lathe having a selectively rotatable spindle on which is mounted, with a hollow adapter, the cylindrical optic in which is retained a fluid connector that is in communication with the adapter which, in turn, is in communication with a source of pressurized fluid containing a fluid whose rate of flow and pressure can be regulated. The pressurized fluid flows serially into the adapter, the connector, and the cylindrical optic and its optical surface, thereby replicating the operational fluid flow pressure through the entire optical surface, without the prior art problem of pressure drops in and pressure deflection of the optical surface which, in turn caused residual finish figure machining error in the optical surface. As a result of the use of this system, and of the performance of the steps comprising the method of replicating the operational fluid flow pressure in the entire optical surface, this prior art residual finish figure machining error is eliminated or at least is significantly minimized.

8 Claims, 4 Drawing Figures

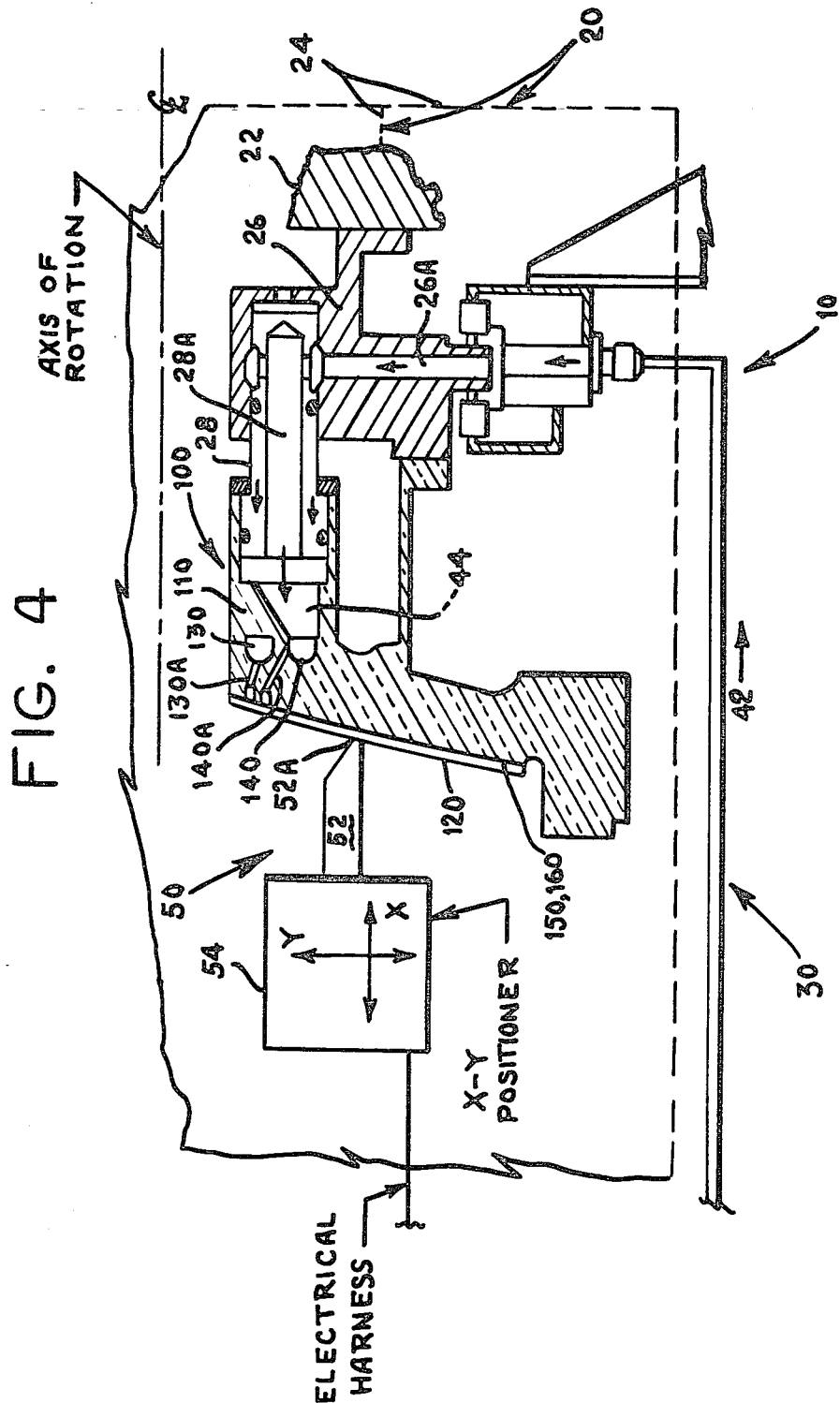

MACHINING A COOLED CYLINDRICAL OPTIC TO COMPENSATE FOR PRESSURE DISTORTION

STATEMENT OF GOVERNMENT INTEREST

The invention described herein may be manufactured and used by or for the Government for governmental purposes without the payment of any royalty thereon.

BACKGROUND OF THE INVENTION

This invention relates generally to optics and more particularly to a system for and a method of replicating the known operational coolant fluid flow local pressure in an optical surface (such as a mirror surface) of a heat exchanger portion of a fluid cooled cylindrical optic to compensate for (and thereby eliminate or significantly reduce) any residual finish figure machining error of the optical surface, which said machining error is normally caused by the coolant fluid flow differential pressure deflection of the optical surface.

The technique presently used in an attempt to minimize the abovementioned figuring error involves filling the optic with water, attaching valved plugs to the coolant ports, and subsequently introducing a predetermined static pressure for figuring, i.e., finish figure or contour machining. Generally, the pressure used is predicted coolant average pressure, i.e., $$\frac{\text{inlet pressure} - \text{discharge pressure}}{2} + \text{discharge pressure}.$$

Since pressure loss in the passages in the optical surface of the heat exchanger portion of the cylindrical optic is usually the largest contributor to the difference between inlet and outlet pressures, it is apparent that large differences can exist between the operating (i.e., operational) pressure and the figuring (i.e., finish figuring machining) pressure. Typically, this results in optical figure error exhibiting a tilt across the heat exchanger for radial and involute passages, and as a local ripple due to the heat exchanger passage geometry, as will be shown later. Additionally, a local bulge or depression is exhibited where manifolds are located within the optical envelope.

One obvious solution to the pressure distortion problem is to duplicate actual coolant flow conditions during figuring. However, a number of problems make this undesirable. Either a very large "blowdown" coolant supply system or a recirculating pumped system is required. The latter would require a temperature control system to maintain coolant temperature. Coolant flow can introduce vibratory pressure fluctuations which can jitter the mirror during figuring. This, in turn, would introduce additional optical figure errors.

Accordingly, what is needed in the art, and is not presently available, is the capability to eliminate (or, at least, to significantly reduce) any residual finish figure machining error of the optical surface of the heat exchanger portion of the cylindrical optic, wherein the aforesaid residual error is caused by coolant fluid flow differential pressure deflection of the optical surface.

SUMMARY OF THE INVENTION

The instant invention satisfies the above-mentioned need in the art. It, therefore, constitutes a significant advance in the state-of-the-art.

According to the invention, the aforementioned need is satisfied by replicating the known (i.e., ascertained) operational coolant fluid flow local pressure in the optical surface of the heat exchanger portion of the cylindrical optic during finish figure machining of the optical surface, i.e., by making pressure conditions in the optical surface during finish figure or contour machining approach the operational (i.e., flowing) conditions. Thereby, pressure deflection (and the resultant induced optical distortion) in the optical surface, which is caused by differences in pressure (i.e., pressure drops) in the optical surface, is eliminated or at least is significantly reduced. As a related matter, it is here to be noted: that the cylindrical optic has fluid flow ports and passageways therein, with some of the passageways being located adjacent to and internal of the optical surface, and that the cylindrical optic referred to is, although it need not be, a mirror.

The instant invention provides that the cylindrical mirror be mounted on the rotating spindle of a precision numerically controlled lathe by way of an adapter. The especially structured adapter has features for rotary seals and fluid transfer passages between the rotating cylindrical mirror and a stationary manifold/seal holder. A fluid connector is retained in the cylindrical mirror and permits fluid transfer between ports in the cylindrical mirror and the adapter. It is here to be noted that only one fluid connector is necessary, because the remaining cylindrical mirror ports can be plugged. A regulated pressurized gas supply is connected to the stationary manifold of the adapter, and the gas supply pressurizes the cylindrical mirror by virtue of the communication of the adapter (i.e., of the stationary manifold thereof) with the fluid connector and the communication of the fluid connector with the cylindrical mirror. Pressure in the cylindrical mirror is predictably varied with radial position of the machine tool, such that local pressure in the passageways where the face (i.e., the optical surface) is being cut will be the same throughout the optical surface and the same as the calculated local pressure in the top of the heat exchanger portion of the cylindrical mirror during the actual operation and use of the cylindrical mirror. The pressure of the regulated gas supply can be controlled by the tool position controller or by a separate controller.

Accordingly, it is an object of this invention to provide a system for replicating the known (i.e., ascertained) coolant flow local pressure in an optical surface of a heat exchanger portion of a fluid cooled cylindrical optic (e.g., a mirror) in preparation for and during the finish figure machining of the optical surface, so that differential pressure deflection of the optical surface is prevented.

It is another object of this invention to provide a system as described hereinabove, wherein the system includes a unique adapter which can be detachably connected to a rotatable spindle of a lathe, which can releasably hold the cylindrical optic, and which has a stationary manifold.

It is still another object of the instant invention to provide a novel fluid flow connector component for the hereinabove described system, wherein the fluid flow connector is removably connectable to the adapter, and wherein the fluid flow connector interconnects the adapter and the cylindrical optic.

It is yet another object of this invention to provide a suitable means for finish figure machining the optical surface of the heat exchanger portion of the cylindrical optic, with this means selectively useable for contact with the optical surface.

It is a further object of the instant invention to provide a unique method of replicating the known (i.e., ascertained) operational coolant fluid flow local pressure in the aforesaid optical surface of the heat exchanger portion of the cylindrical optic.

These objects of the instant invention, as well as other objects related thereto (such as simplicity of the structure of the system, and reliability of the system and of the method), will become readily apparent after a consideration of the description of the invention, together with reference to the contents of the Figures of the drawing.

DESCRIPTION OF THE DRAWING

FIG. 4 is an enlarged view, partially in cross section, of a pertinent portion of the preferred embodiment shown in FIG. 3.

Figure 1:
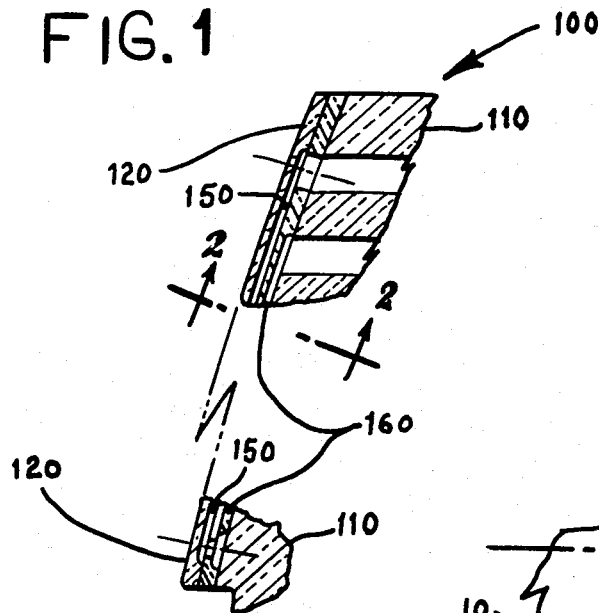
FIG. 1 is a side elevation view, in simplified schematic and pictorial form, in cross section and partially fragmented of the optical surface of the heat exchanger portion of the cylindrical optic, in which said optical surface operational coolant fluid flow local pressure is to be replicated.
Figure 2:
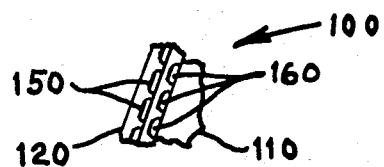
FIG. 2, is a bottom cross sectional view, in simplified schematic and pictorial form, and partially fragmented, of the optical surface shown in FIG. 1, as seen along line 2—2 of FIG. 1.

It is here to be noted that the contents of the Figures of the drawing collectively show the result of practicing the steps of the method portion of the instant invention.

DESCRIPTION OF THE PREFERRED EMBODIMENT

As a preliminary matter, and with reference to FIGS. 1-4, it is to be remembered that the instant invention is for use with a fluid flow cooled cylindrical optic 100, FIGS. 1-4, having a heat exchanger portion 110 with an optical surface 120. It is this optical surface 120 that is to be finish figure machined without the machining error normally caused by the undesired pressure deflection of the optical surface 120.

The cylindrical optic 100 is a mirror, for illustrative purposes, and has fluid flow ports (such as 130 and 140, FIGS. 3 and 4) and passageways (such as 130A and 140A, FIGS. 3 and 4) therein, with some of the passageways (such as the plurality of passageways each designated 150, FIGS. 1-4, and such as the plurality of passageways each designated 160, FIGS. 1-4) being located adjacent to and internal of the optical surface 120.

It is also to be remembered that the instant invention is a system for, and a method of, replicating the ascertained (i.e., known) operational coolant fluid flow local pressure in the optical surface 120 of the heat exchanger portion 110 of the cylindrical mirror 100 during finish figure machining of the optical surface 120 to prevent the residual finish figure machining error of the optical surface 120, which as hereinbefore stated normally results from the undesired differential pressure deflection of the optical surface 120 during prior art finish figure machining of the optical surface 120.

Figure 3:
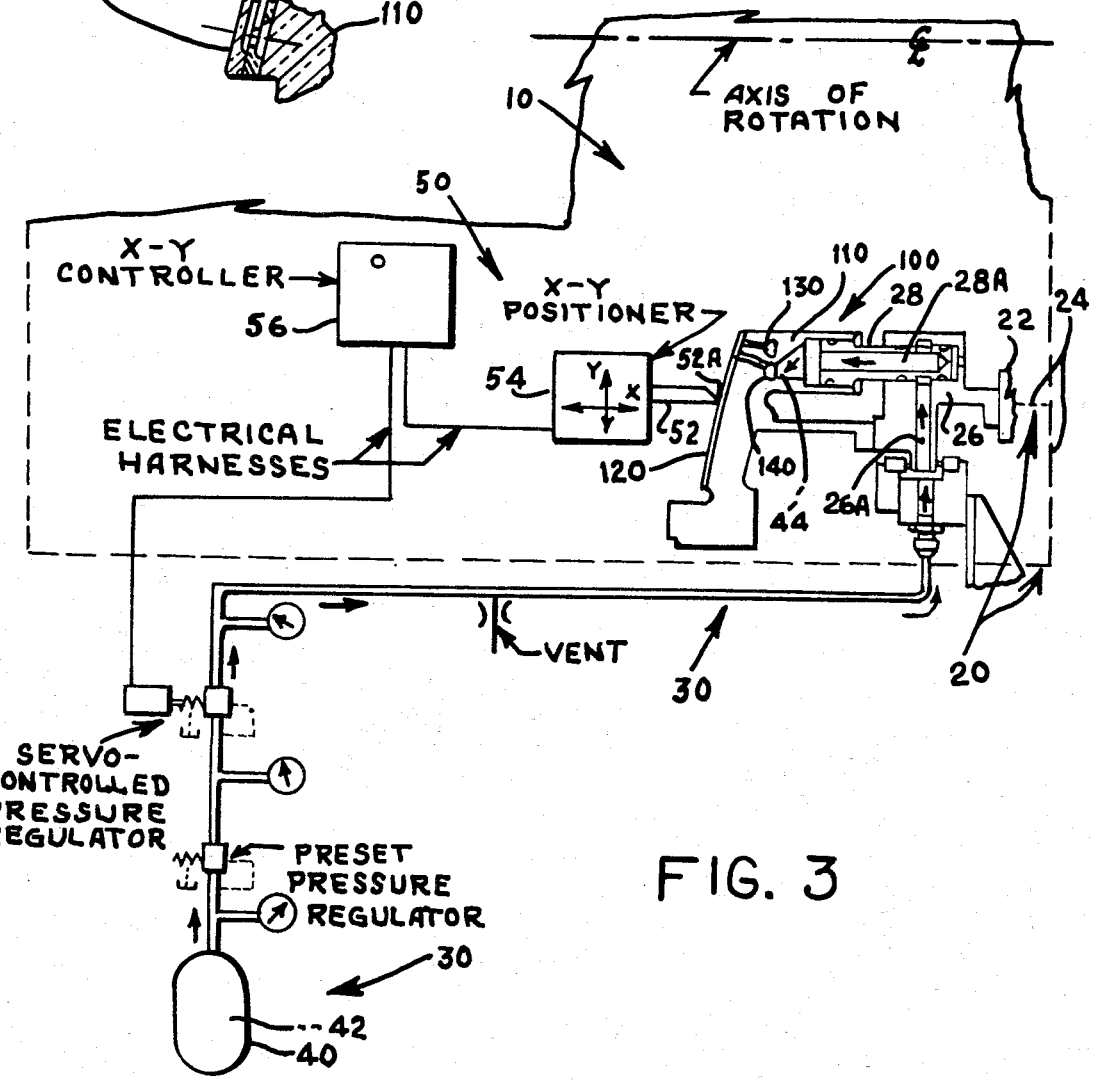
FIG. 3 is a side elevation view, in simplified schematic and pictorial form, partially fragmented, of a preferred embodiment of the apparatus portion (i.e., the system portion) of the instant invention.

In the most basic, and generic structural form, the preferred embodiment 10, FIGS. 3 and 4, of the inventive system portion of the instant invention, which said portion is for use in preparing to finish figure machine the optical surface 120, comprises: means (generally designated 20) for releasably holding and selectively rotating the cylindrical optic 100; and means (generally designated 30) for pressurizing, with a fluid flow, the optical surface 120 of the heat exchanger portion 110 of the cylindrical optic 100 to the known (i.e., ascertained, calculated, and the like) operational coolant fluid flow local pressure, with this means 30 operably associated with the means 20 for releasably holding and selectively rotating the cylindrical optic 100.

Still with reference to FIGS. 3 and 4, and more specifically with regard to the means 20 for releasably holding and selectively rotating the cylindrical optic 100, this means 20 includes: a rotatable spindle 22; means (generally designated 24) for selectively rotating the rotatable spindle 22, with this means 24 operably associated with the rotatable spindle 22; an adapter 26 detachably connected to the rotatable spindle 22 and releasably holding the cylindrical optic 100; and a fluid flow connector 28 removably connected to the adapter 26 and interconnecting the adapter 26 to the cylindrical optic 100. Here it is to be noted that the adapter 26 has at least one fluid flow passageway 26A therein, and that the fluid flow connector 28 has at least one fluid flow passageway 28A therein, with this passageway 28A being in communication with the fluid flow passageway 26A in the adapter 26.

It is also to be noted that the means 24 for selectively rotating the rotatable spindle 22 preferably is a lathe and also more preferably is a precision numerically controlled lathe.

With reference to FIG. 3, the means 30 for pressurizing, with a fluid flow, the optical surface 120 of the heat exchanger portion 110 of the cylindrical optic 100 to the known (i.e., ascertained or calculated) operational coolant fluid flow local pressure in the optical surface 120 includes a source 40 of pressurized fluid, with the pressurized fluid source 40 being capable of delivering fluid flow at a pressure at least equal to the known operational coolant fluid flow local pressure in the optical surface 120. This operational coolant fluid flow local pressure at various specified "radial" positions is computed by either of the following procedures:

(1) Inlet pressure minus coolant pressure loss to the point in question ($P_x = P_{inlet} - \Delta P_{upstream}$), or (2) Discharge pressure plus coolant pressure loss from the point in question to the discharge point ($P_x = P_{outlet} + \Delta P_{downstream}$). Either inlet or outlet pressure will be controlled (set), while its counterpart is a result of the component fluid pressure loss (between inlet and outlet locations) necessary to achieve particular design flow rate. A choice of which of the two computation methods to select is based upon which method will yield the smallest error. Usually the leg that produces the lowest loss yields to the smallest computation error.

Computation of the pressure loss in any flow circuit requires only readily available, conventional, classical methods outlined in typical college textbooks on the subject of fluid dynamics (and emperical characteristics of flow path geometries). An example of such a useful reference for these calculations is more commonly referred to as "Crane" or more specifically entitled "Flow of Fluids Through Valves, Fittings and Pipe," Crane Company, Technical paper No. 410, 1957. As an alternative, conventional computer programs may be utilized as a time saver for the type of analysis indicated above, particularly if complex geometries require repetitive calculations to define losses to multiple radial points. An example of such a program is "PVROP," a program provided by Physical Sciences, Inc. of Research Park, Andover, Mass. Such a program for microcomputers can be utilized to perform the calculations for determining pressure drop of fluids in pipes of circular cross-section. Since for incompressible fluids, non-circular channels can be treated by merely substituting "hydraulic diameter," this program can be readily used for cooled optics wherein $$\text{hydraulic diameter} = 4\left(\frac{\text{cross section area}}{\text{wetted perimeter}}\right)$$

In general coolant channels are usually designed for constant cross-sectional area. If such is the case, pressure loss in a channel is a linear function of the channel length ($\Delta P = Kx$ where $K$=constant, $x$=length along passage). Moreover, a flow test prior to figuring or contouring can be used to "anchor" the above calculations. The pressurized fluid source 40 is in communication with the fluid flow passageway 26A in the adapter 26. As a matter of preference and not of limitation, the pressurized fluid 42 is a gas, and the preferred gas is nitrogen. However, it is to be noted that, if increased spring rate or more responsive pressure control is desirable, then the cylindrical optic 100 and the adapter 26 can be filled with a coolant liquid, with water or freon being preferred, and pressurized with gas volume from the pressurized fluid source 40.

For the purpose of actually finish figure or contour machining the optical surface 120, the system 10 may further comprise (as is shown in FIGS. 3 and 4) a means (generally designated 50) for finish figure machining of the optical surface 120, with this means 50 selectively useable for contact with the optical surface 120. This means 50 includes: a single point tool, such as 52, with a diamond tip, such as 52A; means (generally designated 54), operably connected to the tool 52, for positioning the tool 52 relative to the optical surface 120; and, means (generally designated 56) for controlling the movement of the tool 52 on the optical surface 120, with this means 56 operably associated with the tool positioning means 54.

It is to be noted that the means 54 for positioning the tool 52 relative to the optical surface may, and preferably does, comprise an electrically energized and activated conventional X-Y positioner. Similarly, the means 56 for controlling the movement of the tool 52 on the optical surface 120 may, and preferably does, comprise an electrically energized and activated conventional X-Y controller, with this means 56 in electrical connection with the means 54.

As a matter of preference and not of limitation, the means 50 for finish figure machining of the optical surface 120 is operably associated with the means 30 for pressurizing the optical surface 120 such that the rate of fluid flow and the pressure of the pressurized gas 42 are regulated by the finish figure machining means 50.

Also, as a matter of preference and not of limitation, the means 54 for positioning the single point tool 52 relative to the optical surface 120 and the means 56 for controlling the movement of the single point tool 52 on the optical surface 120 are operably associated with and are controlled by the precision numerically controlled lathe 24. It is here to be remembered that this lathe 24 is also operably associated with, selectively rotates, and controls the rotatable spindle 22.

DESCRIPTION OF THE INVENTIVE METHOD

The method portion of the instant invention (i.e., the method of replicating the known operational coolant fluid flow local pressure in the optical surface 120 of the heat exchanger portion 110 of the fluid flow cooled cylindrical optic 100, e.g., a mirror, in preparation for and during the finish figure machining of the optical surface) essentially comprises the below-listed steps.

First, securing a fluid flow connector means (such as 28) to the cylindrical optic 100, whereby the connector 28 and the optic 100 are in communication for fluid flow.

Next, mounting the cylindrical optic 100, together with the fluid connector 28 secured thereto, to a releasable holding means (such as adapter 26) having at least one fluid flow passageway (such as 26A), whereby the fluid flow connector 28 and the passageway 26A of the adapter 26 are in communication for fluid flow.

Then, attaching the adapter 26, with the cylindrical optic 100 mounted thereon and with the fluid connector 28 secured to the optic 100, to a selectively rotatable means, such as rotatable spindle 22 of precision numerically controlled lathe 24.

Lastly, connecting a source of pressurized fluid (such as source 40) to the fluid flow passageway 26A of the adapter 26, with the source 40 delivering the fluid 42 in a fluid flow at a pressure at least equal to the known (i.e., ascertained) operational coolant fluid flow local pressure in the optical surface 120 of the heat exchanger portion 110 of the fluid cooled cylindrical optic 100, whereby the source 40 of pressurized fluid 42 is in fluid flow communication with the adapter 26, and thereby is serially in fluid flow communication with the fluid flow connector 28, the cylindrical optic 100, and the optical surface 120 of the heat exchanger portion 110 of the cylindrical optic 100.

MANNER AND USE OF THE PREFERRED EMBODIMENT

The manner of use, and of operation, of the preferred embodiment 10 of the apparatus portion of (i.e., the system portion) the instant invention can be easily ascertained by any person of ordinary skill in the art from the foregoing description, coupled with reference to the contents of the Figures of the drawing.

For those not of the art, the manner of use and operation of the apparatus portion 10 of the instant invention can be learned by correlating the essential and fundamental steps of the method portion of the invention with the contents of the Figures of the drawing and with the description of the preferred embodiment 10 of the instant invention.

CONCLUSION

It is abundantly clear from all of the foregoing, and from the contents of the Figures of the drawing, that the stated objects of the instant invention, as well as other objects related thereto, have been achieved.

It is to be noted that, although there have been described and shown the fundamental and unique features of the apparatus portion of the instant invention as applied to a preferred embodiment 10, nevertheless various other embodiments, variations, adaptations, substitutions, additions, omissions, and the like may occur to and can be made by those of ordinary skill in the art. For example, the preferred embodiment 10 can be adapted for use with a fluid flow cooled linear optic, rather than with the fluid flow cooled cylindrical optic 100 referred to herein; and, the rate of fluid flow and the pressure of the pressurized gas 42 can be regulated by a separate controller (not shown) which senses the position of tool 52, rather than by the finish figure machining means 50.

It is also to be noted that, because of the teachings herein, it may occur to others of ordinary skill in the art that, in appropriate particular circumstances, the number of the basic and fundamental steps of the inventive method portion of the instant invention can be increased, decreased or otherwise varied, and/or that their sequence can be changed. In this regard, it is to be noted and remembered that, in spite of any variations in the number or sequence of the steps of the particular method set forth herein, only the same results as described herein will be obtained.

What is claimed is:

1. A system for finish contour machining the optical surface of a fluid flow cooled cylindrical optic and replicating the predetermined operational coolant fluid flow local pressure in said optical surface during said machining, wherein said cylindrical optic has a fluid flow passageway therein, with said passageway being located adjacent to and internal of said optical surface, said system comprising:

a rotatable spindle;
    means operably connected to said spindle for selectively rotating said spindle;
    an adapter detachably connected to said spindle releasably holding said cylindrical optic;
    a fluid flow connector removably interconnected between said adapter and said fluid flow passageway of said cylindrical optic;
    a single point tool;
    means operably connected to said single point tool positioning said tool relative to said optical surface;
    means operably connected to said tool positioning means controlling the movement of said tool positioning means so as to control the movement of said tool, said controlling means also providing a signal representative of said predetermined operational local pressure in said optical surface of said cylindrical optic based upon the position of said tool relative to said optical surface of said cylindrical optic;
    means providing pressurized fluid to said optical surface of said cylindrical optic; and
    means regulating the pressure of said fluid in accordance with said signal from said controlling means, said pressurized fluid providing means delivering said fluid at a pressure substantially equal to said predetermined operational local pressure in said optical surface, whereby said predetermined operational local pressure in said optical surface of said cylindrical optic is substantially replicated.

2. A system, as set forth in claim 1, wherein said cylindrical optic contains a liquid and said source of pressurized fluid contains a pressurized gas.

3. A system, as set forth in claim 2, wherein said liquid in said cylindrical optic is water and said pressurized gas is nitrogen.

4. A system, as set forth in claim 2, wherein said liquid in said cylindrical optic is freon and said pressurized gas is nitrogen.

5. A system, as set forth in claim 2, wherein said cylindrical optic is a mirror.

6. A system, as set forth in claim 5, wherein said single point tool has a diamond tip.

7. A system, as set forth in claim 1, wherein said means for selectively rotating said rotatable spindle includes a precision numerically controlled lathe, and wherein said means for positioning said single point tool relative to said optical surface and said means for controlling the movement of said single point tool on said optical surface are operably associated with and are controlled by said precision numerically controlled lathe.

8. A method of finish contour machining the optical surface of a fluid flow cooled cylindrical optic and replicating the predetermined operational coolant fluid flow local pressure in said optical surface during said machining, said method comprising the steps of:

(a) securing said cylindrical optic to a means for selectively rotating said cylindrical optic;
    (b) moveably positioning a single point tool for finish contour machining said optical surface of said cylindrical optic adjacent said optical surface of said rotating cylindrical optic;
    (c) providing control means;
    (d) controlling the movement of said tool to finish figure machine a predetermined contour on said cylindrical optic surface;
    (e) providing a signal to the control means representative of said predetermined operational local pressure in said optical surface of said cylindrical optic, said predetermined operational local pressure being based upon the position of said single point tool relative to said optical surface of said cylindrical optic;
    (f) receiving said signal at the control means and responsive thereto providing a pressurized fluid substantially equal to said predetermined operational local pressure to said optical surface of said cylindrical optic in accordance with said signal whereby said predetermined operational local pressure in said optical surface of said cylindrical optic is substantially replicated during said finish contour machining procedure.

* * * * *